Oct. 21, 1969  C. W. BRANDON  3,473,344

METHOD AND APPARATUS FOR COOLING AND HEATING

Original Filed Aug. 6, 1965  5 Sheets-Sheet 1

INVENTOR.
CLARENCE W. BRANDON

BY
*Head & Johnson*

ATTORNEYS

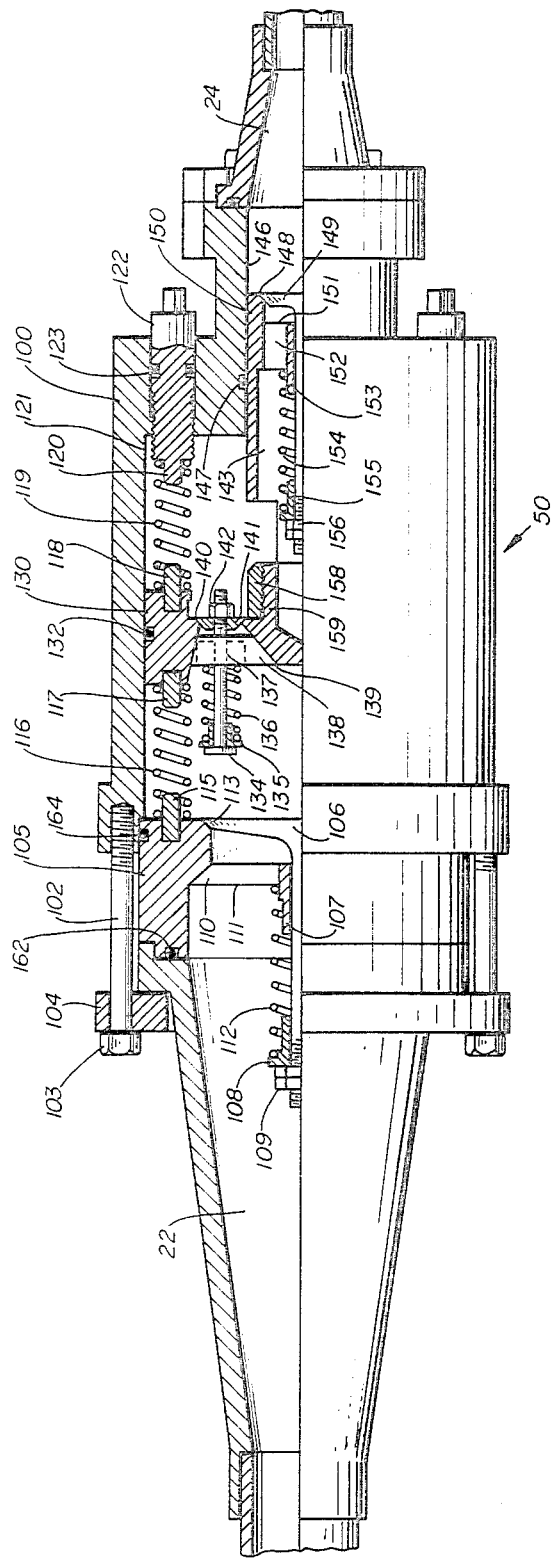

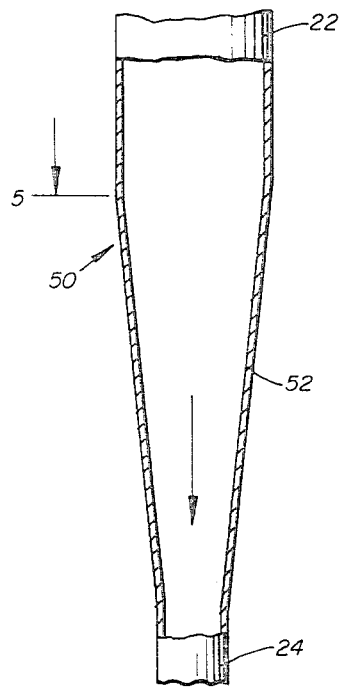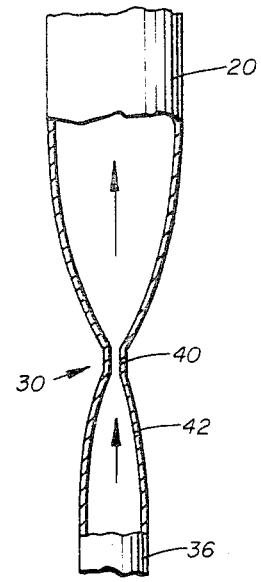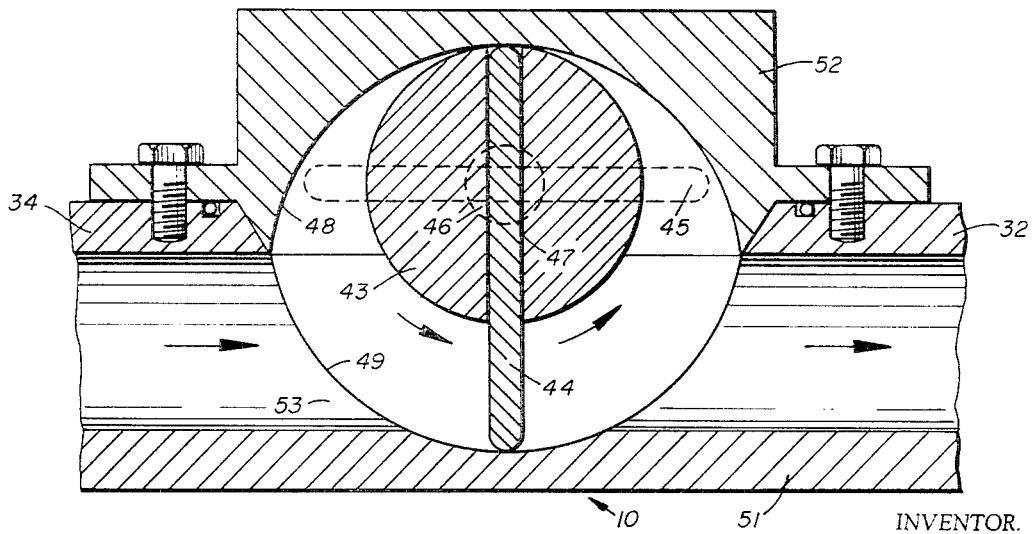

United States Patent Office 3,473,344
Patented Oct. 21, 1969

3,473,344
METHOD AND APPARATUS FOR COOLING AND HEATING
Clarence W. Brandon, Tallahasse, Fla., assignor of twelve and one-half percent to Orpha B. Brandon, Tulsa, Okla.
Continuation of application Ser. No. 477,869, Aug. 6, 1965. This application Dec. 1, 1967, Ser. No. 687,402
Int. Cl. F25b *1/00, 13/00*
U.S. Cl. 62—115                                    49 Claims

ABSTRACT OF THE DISCLOSURE

A refrigeration or heat pump system wherein the liquid phase is maintained in equilibrium with its vapor phase and the refrigerant is circulated by a pump or sonic wave generator means located in the liquid of the condenser.

---

This invention relates to refrigeration, heating and related thermal energy transfer systems. More particularly, this invention relates to methods and apparatus wherein a liquid is maintained in equilibrium with its vapor phase, and where heat is absorbed by the vapor and given off by the liquid. Further, this invention relates to new and useful improvements in the use of energy carrying waves having the characteristics of sonic waves, which are utilized to increase thermal transfer efficiency and a resultant decrease in input energy requirements.

CROSS REFERENCE TO RELATED APPLICATIONS

This invention is a continuation of copending application S.N. 477,869, filed Aug. 6, 1965, now abandoned in favor of this application. This application further is related to the inventions disclosed in application S.N. 665,995, filed June 17, 1957, now Patent No. 3,302,720, and in application S.N. 149,953, filed Nov. 3, 1961, now Patent No. 3,255,601, in the name of Clarence W. Brandon as inventor.

All refrigeration and heat pumping systems operate under the scientific laws of thermodynamics, heat transfer and fluid flow. Usually, a working fluid, which may be one of the well known refrigerants, is used to transport heat away from the area to be cooled and to an area that is to be heated. The most common systems used for this purpose are the mechanical compression types and the absorption types. Although both operate under different theories, they both depend upon the efficiency of thermal transfer in a condensation phase, where latent heat of the refrigerant is removed, and an evaporation phase, where latent heat of the area to be cooled is added to the refrigerant.

Therefore, the principal object of this invention is to provide methods and apparatus whereby a liquid is maintained in equilibrium with its vapor phase throughout unidirectional circulation of the refrigerant throughout the system. Further, this object is obtained by circulating means in the liquid phase, in contrast to the normally used compression of the vapor phase.

Another important object of this invention is to provide means whereby a liquid pump or pumps may be installed in the condenser, thus providing two or more portions of the condenser, each of which has undirectional increase of pressure applied to each in turn, with corresponding increases in temperature of the liquid refrigerant to increase the heat transfer rate.

A further very important object of this invention is to provide means whereby an energy carrying wave generator or generators may be installed in the liquid of the condenser and by the operation of the generator or generators heat may be absorbed by the vapor in the evaporator and given off by the liquid in the condenser.

Still another important object in conjunction with the last above named object is to provide means whereby equilibrium of the liquid is maintained with its vapor phase, wherein the condenser is maintained substantially full of liquid and the evaporator is maintained substantially in a vapor phase, whereupon energy carrying waves are produced therein and unidirectional circulation of the refrigerant is achieved thereby.

Yet another object in conjunction wtih the last two objects is to provide a means whereby compression of the vapor from the evaporator is produced in a step by step manner by the energy carrying waves and wherein the heat of the vapor is given over into the compression phase of the energy carrying wave, whereby the energy content of the wave is increased and the requirement of energy input into the system, to maintain the circulation of the refrigerant, is reduced, while the thermal transfer efficiency of heat into the evaporator and from the condenser is increased therein.

A further main object is to provide means wherein the liquid within the condenser is divided into portions that have a unidirectional increase of pressure within the portions and wherein eductions of liquid from the condenser into the evaporator is done during the rarefaction phase of the energy carrying wave, thereby increasing the energy content thereof.

An object in conjunction with the use of energy carrying waves is to provide methods and apparatus wherein the sole means of transferring fluids from an area of low pressure to one of high pressure is by the use of an energy carrying wave generator or generators, and wherein the low pressure fluids being transferred balance the high pressure fluids, whereby the energy input into the energy carrying wave generator is maintained at a minimum.

A further important object is to provide methods and apparatus whereby the liquid in the condenser is maintained under a pressure which is sufficient to maintain the liquid in substantially an all liquid phase and whereby the use of an energy carrying wave generator or generators located within the liquid, which produces energy carrying waves within the liquid, vapor is inducted into and from the condenser, and wherein said induction and eduction of the vapor assists in the maintenance of said energy carrying wave. A continuing object in conjunction with this last object is to provide method and apparatus whereby the induction and eduction means at the opposite ends of the condenser are substantially in balance so that the input energy requirements needed to initiate and maintain the energy carrying wave which produces the induction and eduction of the vapor into and from the condenser is kept at a minimum.

Yet another important object is to provide process and means whereby energy may be taken from the expansion of the fluid and given to the compressing of the fluid while circulating the fluid by pump and/or energy wave generator.

A further object is to employ method and apparatus wherein implosions and implosive reactions are repetitively used to obtain energy wave velocities exceeding sonic velocities in a fluid medium, and where said energy waves may be used in a circulatory manner and where said fluid may be a refrigerant and heating and cooling may be accomplished by expanding and compressing the fluid and utilizing the heat and the cold.

These together with other objects and advantages which will become apparent reside in the details of construction and operation as more fully hereinafter described and claimed, reference being had to the accompanying drawings forming a part hereof, wherein like numerals refer to like parts throughout, and in which:

FIGURE 3 is an enlarged view in partial vertical section of one means of fluid pressure increase which may be employed in the system.

FIGURE 4 is an enlarged view in partial vertical section of another means which may be employed for fluid expansion in the system.

FIGURE 6 is an enlarged view in partial vertical section of another pump or energy wave generator which may be employed in the system.

FIGURE 8 is an enlarged view in partial cross section of another means of fluid pressure increase or vapor compression that may be used in the system, and is more complex and requires that an energy bearing wave generator be in the system for its use.

General description

Figure 1:
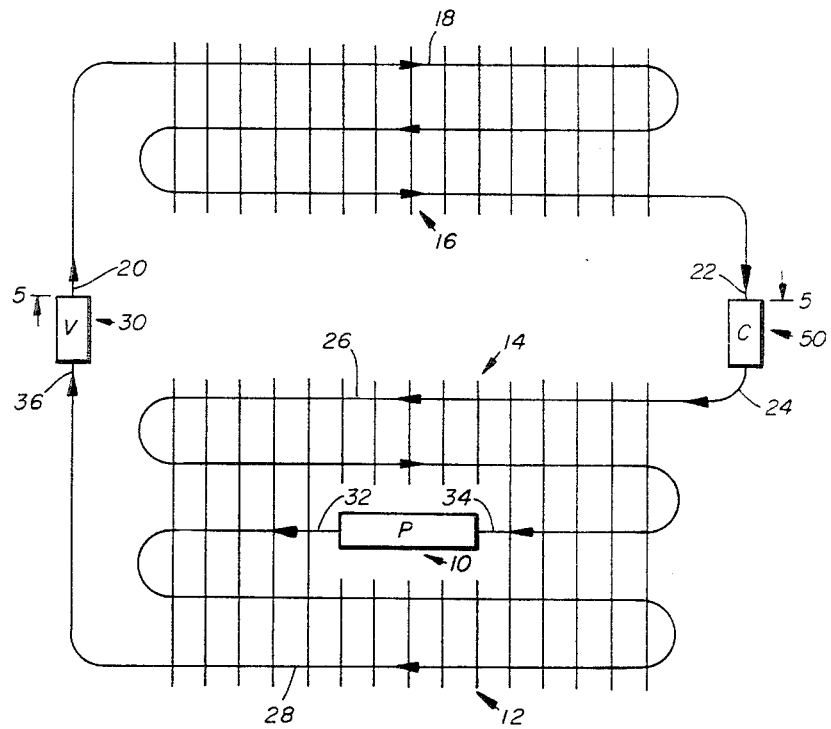
FIGURE 1 is a diagrammatic view illustrating in its simplest form the application of the principles of this invention to a conventional refrigerating and heat pumping system of the circulatory type, with the exception that the pump for the circulatory system has been moved down into the condenser.

Generally speaking, this invention in its simplest form is concerned with the fact that a liquid when placed in equilibrium with its vapor phase within an enclosure will substantially maintain its liquid phase and its vapor phase despite considerable variations of pressure and temperature that may be imposed upon the enclosed system. In this invention, advantage is taken of this thermodynamic principle, in the absorption of heat by the vapor phase and of the giving off of heat by the liquid phase. This is done by the transfer of fluid in the completely liquid state, by a pump or pumps located in the liquid or condenser portion of the system, against a pressure reduction means located at the equilibrium point between the liquid and the vapor, whereupon heat is absorbed by the vaporized fluid in the vapor or evaporator portion of the system and heat is rejected from the circulating fluid upon its re-entry into the liquid at the equilibrium point between the liquid and its vapor.

In the above simplest form of this invention, there are step by step increases in pressure upon the liquid which is in two or more portions within the condenser as the circulating pump or pumps force the liquid against the fluid expansion means. The increase in pressure of the fluid in its completely liquid state as hereinbefore referred to, obviously involves compression of the liquid by the pump or pumps by a substantial amount or in excess of that which is ordinarily required to merely maintain flow of a liquid with substantially no change in pressure between locations upstream and downstream of the pump. Thus, the increase in pressure referred to is occasioned by an increase in temperature of the liquid which is more than that ordinarily resulting from the conversion of mechanical pump energy into heat energy added to the liquid. Costly compression means for the vapor, for its conversion into a liquid, are not needed for the thermodynamic processes that may use the principle of this invention in its simplest forms, rather simple pumps such as centrifugal, gear or reciprocating types, or modifications thereof, may be used. If desired, a fluid expansion and compressor motor may be used at the equilibrium points and by being connected may lower input energy.

In a slightly more complex form of this invention, energy carrying waves are circulated throughout the system along with the fluid. This may be done by placing an energy wave generator, or generators, within the liquid of the condenser, thereby dividing the liquid in the condenser into portions, and by the use of these energy wave generators energy carrying waves may be initiated and maintained unidirectionally in both the liquid and the vapor portions which are substantially maintained in equilibrium throughout the system. Also, fluid expansion and compressing motors may be installed at the equilibrium points and be connected to lower the input energy that is required to operate the system.

In the use of energy bearing waves such as are taught in the use of some of the forms of this invention, the energy waves not only facilitate the phase changes from a liquid to a vapor and from a vapor to a liquid, but also increases the heat transfer co-efficiency of the liquid and vapor phase contacts with the containing walls of the system by the reduction in the thickness of the boundary layers on these walls through which the heat must be transferred.

In more complex forms of this invention, regulated pressure may be exerted upon the enclosed liquid phase of the fluid, and this pressure may be an assisting force for rapid absorption of the vapor phase into the liquid phase. Where a condensing tube is used, that has one or more energy wave generators placed within portions of the liquid, then regulated pressure forces, beyond that of the vapor, may be placed on opposing ends of the liquid in the condenser and so be regulated or set as to balance areas of pressure across the wave generator or generators that are operating within the liquid of the condenser. In this manner vibration may be substantially reduced in the system and the energy requirements for initiating and maintaining the energy carrying waves in the system are considerably reduced.

A greatly increasing factor, in the use of energy bearing waves as shown in this invention, in the amount of heat absorbed by the vapor of the system and rejected by the liquid of the system, is that heat as energy is given into a phase angle of the compressive portions of the energy bearing waves. Heat alone may be utilized to initiate and maintain an energy carrying wave, so it may be seen that the more heat that is available to the vapor phase of the system of this invention and the more it is converted into energy within the circulating energy carrying wave, then the efficiency of the system will be increased rather than decreased as is the situation in conventional refrigerating and heat pumping systems, and like thermodynamic processes and systems.

Detailed description

In FIGURE 1 there is diagrammatically illustrated a refrigerating and heat pumping system of the circulatory type to which the principles of this invention may be easily applied and which system includes a fluid compression means 50, a fluid expansion means 30, a refrigerant circulating means 10, an evaporator unit indicated generally by the numeral 16, and two condenser units indicated generally by the numerals 12 and 14. The evaporator unit is considered to extend from the fluid expansion means 30 to the fluid compression means 50, while the condensing units extend from the fluid compression means 50 to the fluid circulating means 10 and then to the fluid expansion means 30. In the refrigerating and heat pumping system illustrated, the refrigerant is understood to have a unidirectional circulation as indicated by the arrows in FIGURE 1.

The evaporator unit 16 consists of a set of evaporating coils 18 which are understood to be in good heat exchange relation with a heating medium from which heat is removed, thus cooling the surrounding medium. The evaporating coils 18 of the evaporator are connected as by a conduit 20 with the fluid expansion means 30 and by a further conduit 22 with the intake side of the fluid compression means 50, it being understood that the coils 18 together with the conduits 20 and 22 comprise the evaporator unit 16.

The condenser unit 14 likewise includes a conduit 24 which receives the fluid from the fluid compression means 50 and by means of which the refrigerant is delivered to the condensing coils 26 which likewise are in good heat exchange with a surrounding medium, the latter being a cooling medium to which heat may be discharged from the condensing coils 26, and a conduit 34 by means of which the fluid is delivered to the fluid circulating means 10. The condenser unit 12 also includes a conduit 32 which receives the fluid from the fluid circulating means 10 and by which the refrigerant is delivered to the condensing coils 28 which likewise are in good heat exchange with a cooling medium to which heat may be discharged, and a conduit 36 which delivers the fluid to the fluid expansion means 30.

It is understood that the fluid circulating means 10 is operated from any suitable power source, as desired, and may be, in the simplest form of this invention, a pump or pumps of any desired type such as centrifugal, gear or reciprocating, or modifications thereof, that would have a shaft to which the power source could be connected.

Figure 2:
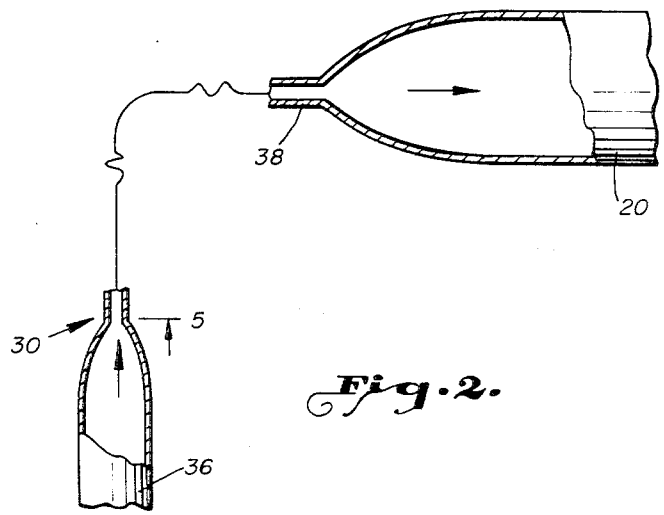
FIGURE 2 is an enlarged view in partial vertical section of one means which may be employed for fluid expansion in the system.

Attention is next directed to FIGURE 2 which is of a conventional capillary tube as is used in many present day refrigerating systems and which represents the fluid expansion means 30 of FIGURE 1, and is used as one means of fluid expansion in the simplest form of this invention, although other means such as expansion valves, or motors used as a power source, may also be used. Conduit 36 communicates with the capillary tube 38, so that fluid from conduit 36 may enter capillary tube 38 and be discharged at a reduced pressure into conduit 20.

Now observing FIGURE 3, it may be seen that in this type of fluid compression means 50 that conduit 22 enters into restriction means 52, which may be constructed of a conical shape, and at its bottom, restriction means 52 enters into conduit 24, so that fluid entering unidirectionally from conduit 22 may be compressed in its descent down the restricting throat. Also compression motors may be used, that are connected to some outside power source.

Next considering FIGURE 4, another type of fluid expansion means 30 is designed to be used with the simpler form of this invention, except that now an energy wave generator or generators replaces the conventional liquid pump or pumps used in the simplest form of this invention as the circulating means 10 for the fluid. Here advantage is taken of the well known fact that energy bearing waves with sonic characteristics may be reflected and focused to a central point of intensity, and may be conducted through a capillary orifice and be again expanded into an energy carrying wave in a larger enclosure. Here smaller conduit 36 focuses the energy bearing waves by means of the parabolic or focusing surface 42 through the capillary orifice 40 along with the fluid in a circulatory manner, whereafter both the energy carrying waves and the fluid are expanded out into the larger conduit 20. Also in this simpler form of the invention an expansion motor may be used for means 30 and the differential energy may be employed to assist in the operation of the system by being connected to a compression motor at the equilibrium point between the vapor and the liquid.

Figure 5:
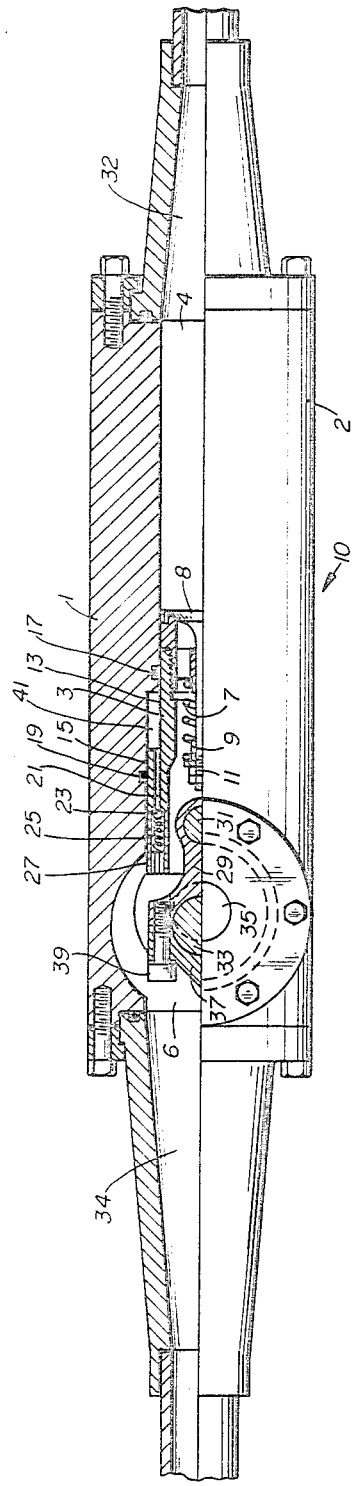
FIGURE 5 is an enlarged view in partial vertical section of a pump or energy wave generator which may be employed in the system.

One type of energy wave generator that may be used with this simpler form of the invention, wherein energy bearing waves are used, is that as is shown in FIGURE 5 wherein a cylindrical body 2 attached at opposite ends to conduits 34 and 32, receives slidably a piston 3 which is connected with the crankshaft 35 for reciprocation thereby, from some outside source of energy.

Piston 3 includes a wrist pin 31 to which is attached a connecting rod 29 which is attached to crank throw 33 by bearing cap 37 which is retained in place by bolts 39, so as to give reciprocation to the piston by the turning of crankshaft 35. The piston 3 is of a two or more step design with the larger area or areas 15 to the rear of the piston towards the connecting rod 29. Within this larger area 15 there is a small bore 21 which is unidirectionally yieldingly closed by spring 25 exerting a pressure against ball check 23, said spring 25 being held in position by spring retainer 27 which has a hollow center bore.

At the smaller diameter end 13 of piston 3 is valve assembly head 1 which is threadably attached to piston 3. Within the valve head assembly 1 there is slidingly retained valve 8 which is unidirectionally urged to a closing position by spring means 7 which is kept in a pressured condition by spring retainer 9 which is adjustably positioned by nut and thread means 11.

Surrounding the two step piston 3 there are packing means 17 and 19 which are enclosed within apertures within the two step areas 4 and 6 of cylinder 2 so as to prevent leakage of fluid into the cylinder area 41 which separates the two areas of the piston. Should some leakage occur into this area 41 then upon forward thrusts of the piston 3 the reduced area that would occur would cause ball check 23 to open and reject the surplus fluid into the larger area 6.

By the proper pressuring of spring 7 and the regulating of pressure upon fluid in the entering area 6, then higher pressures may be maintained in and pumped through smaller area 4 by the reciprocation of piston 3, and the higher the rate of reciprocation of the piston 3 the greater the intensity of energy bearing valves that will be produced in both areas 4 and 6 of cylinder 2, except there will be a unidirectionally greater thrust forward of the piston 3 at the valve head 1 and a unidirectional addition to the particle velocity of the compression portion of the energy carrying wave being produced by the out-thrust of the piston against pressured area 4. Besides these features of the two step design of the piston 3, there is another very important function of this design. That is that when the pressures are adjusted within low pressure area 6 and high pressure area 4 in proper relationship between a fluid being conducted through valve 8 to piston 3, then the energy being exerted in the to and fro movements of the piston 3 is substantially in balance due to the larger area of entering area 6 as compared to the outflowing area 4. This has the same effect that would be occasioned by the stretching of a spring between two supports. Although there would be inward pressure applied to each of these supports, yet the center of the spring could be oscillated by a considerably smaller force than would be required should one end of the spring be released from its support and the same degree of oscillation be maintained in the remaining half of the spring, with the means of oscillation and remaining support being at the same location as when both halves of the spring were being supported in a stretched position.

These same features of pumping fluids from a lower pressure to a higher pressured area, the intensifying of an energy bearing wave by applying unidirectional thrust of particle velocity acceleration to the compression portion thereof, and the substantially equal balancing of opposing energies and of the required energy input, is shown, produced and taught in FIGURES 5, 31, 31–A, 32, 33 and 36 of my copending application Ser. No. 665,995, except that in the design used in this co-pending application the balancing is done by using both the area of a lowered pressured area and an area of balance on an opposing pressured piston on a crank shaft, to achieve the balancing in opposition to the higher pressured area.

In operation, the energy wave generator of FIGURE 5 may be preferably located at the pressure or compression and rarefaction portions of an energy carrying wave or waves where particle velocities are at a minimum or are non-existant. By sufficient reciprocation velocity, which can be considerably higher than sonic velocities in the fluid, if desired, then unidirectional particle velocity accelerations may be imposed outward upon and during the creation of the pressure portions of the energy bearing waves. An added factor to the particle velocity accelerations that may be achieved to energy carrying waves is that when fluid is being input into and output from the system then the unidirectional addition of the particles of the fluid during the particle velocity accelerations being given at the compression phase of the energy bearing wave combine in increasing the intensity of the outgoing energy wave.

Where partial or substantially total reflections of the energy carrying waves occur, then the reciprocation of the piston 3 may be so timed in relationship to the prime wave length or one of its harmonics that are being used in the system, so that pressure reverses or rarefactions occur or coincide during the reversings of the reciprocations of the piston 3. Naturally, when the pressure portions of the energy waves have reversed their positions in a compression phase to coincide with the unidirectional particle velocity accelerating out thrusts, then added particle velocities may be given to the energy bearing waves, and energy carrying waves may be produced that will have velocities exceeding sonic velocities in the fluids used.

Referring now to another type of energy bearing wave generator that may be used in the simpler system, as is shown in FIGURE 6, there is a generator housing composed of two parts 51 and 52. Housing part 51 has a bore 53 which is connected at opposite ends to conduits 34 and 32 comprising parts of the condenser. Within housing part 52 is located rotatable shaft 46 which rotates fluid impeller containing means 43.

Fluid impeller means 44 is wider than the diameter of bore 53, and is slidably retained within member 43 so that although impeller means 44 is in contact with curved recesses 48 and 49 within outer housings 51 and 52, which are machined of a width approximately that of impeller 44, as shown at the position as at 44, yet upon rotation of the shaft 46, as by some outside energy source, the action of the impeller 44 in impelling fluid from entering conduit 34 outward through conduit 32, will cause the impeller 44 to assume substantially the position shown as at 45 upon a quarter turn of the shaft 46. This is due to the fact that the fluid that would be trapped between the end of impeller 44 and the curved bore 48 in the upper housing, is a shifting factor in the inward sliding of the impeller 44 within the housing member 43. Upon the further unidirectional rotation of the shaft 46 and the impeller 44 towards another 90° of rotation the action of the escaping fluid from curved recess 48 upon the end of the impeller 44 further slidingly shifts the impeller blade inward until the impeller 44 again assumes its substantially complete closure of curved bore 49 which is within lower housing 51.

In operation, the energy wave generator of FIGURE 6 may be most advantageously used when located where the particle velocity no pressure variation portion of an energy carrying wave occurs. By sufficient rotational velocity, which can be considerably higher than sonic velocities in the fluid, if desired, then unidirectional pressure thrusts or particle pressure accelerations may be achieved at the particle velocity portions of energy carrying waves. Where partial or substantially total reflections of the energy bearing waves occur, then the rotation of the shaft 46 may be so timed in relationship to the prime wave length or one of its harmonics that is being used in the system, so that particle velocities counter to the rotation of the impeller 44 may be allowed to reverse past the impeller in a rearward direction to the pressure outthrust of the impeller 44 when the impeller is in a position as shown at 45. Naturally, when the particle velocities have reversed their position to coincide with particle accelerating means 44, then added pressure accelerations may be given to the energy bearing waves, at the normally no pressure variation portion, and energy carrying waves may be produced that will have velocities exceeding sonic velocities in the fluids used.

Also, the implosion and implosive reaction energy wave generator of FIGURE 2 of my co-pending application Ser. No. 149,953 may be used in the system for fluid pumping means 10, either singly, in series with itself or with the energy wave generators of FIGURES 5 and 6 of this application, and velocities of energy wave travel may be caused to exceed sonic velocities in the medium or paths used for the wave travel.

Figure 7:
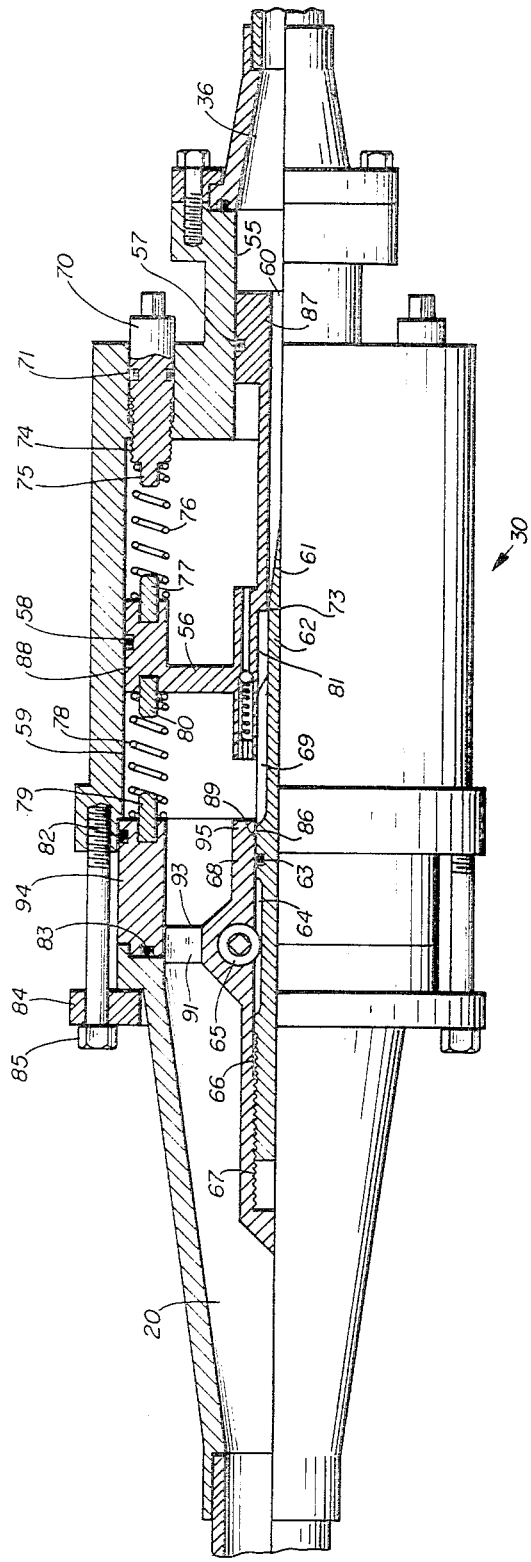
FIGURE 7 is an enlarged view in partial cross section of yet another means which may be employed for fluid expansion in the system, and is more complex and utilizes an energy bearing wave to allow periodic fluid expansion.

Consider next FIGURE 7 which is of a more complex type of fluid expansion means 30 and one that is to be used within a system employing energy carrying waves. A main body 54 which is connected to fluid entering conduit 36 and fluid exiting conduit 20, has within it a two stepped diameter piston 56. The smaller piston end 87 of the stepped diameter piston 56 travels within smaller bore 55 and has packing means 57 thereon, whereas the larger piston end 88 travels within bore 59 and has packing means 58 thereon. Between main body 54 and exiting conduit 20 there is interposed needle valve control body 68 which is in fluid seal engagement with body 54 by sealing member 82 and with conduit 20 by sealing member 83, and is locked to these members by pressure member 84 and bolt means 85 so as to be rigidly held in position.

Within needle valve control body 68 is needle valve 62 which is in close tolerance fit with bore 60 within the smaller piston 87 of stepped piston 56, so that in the position as shown at 73 the tapered end 61 extends into bore 60 and needle valve 62 closes bore 60 for a purpose later explained. Needle valve 62 has a larger portion 86 which extends back into needle valve control body 68 and which is grooved as at 69 for passage of fluid and which is in alignment with bore 81 within stepped piston 56. This larger portion 86 of needle valve 62 has a sealing means 63 against the escape of fluid along bore 89 and further along has angular gear teeth 64 cut thereon for causing rotation of the needle valve 62 when cross angled gear 65 is turned. This turning of the needle valve 62 causes screw threaded portion 66 to go into or out of threaded bore 67 according to whether the rotation is clockwise or counter-clockwise. This entering or withdrawing of threaded portion 66 from threaded bore 67 in turn causes tapered end 61 to leave position 73 in further sealing bore 60 of piston 87 or by going the other direction in forming an increasing area of opening of bore 60 and thus allowing an increasing amount of fluid to escape into bore 69 then through bores 91 and thus out into exiting conduit 20, where it may expand. Also, if desired, control of the needle valve may be by use of pressures and/or temperatures from the system at selected points.

Bores 91 are several in number and extend radially around bore 89 within needle valve control body 68, and have ribs 93 separating the several bores 91, said ribs 93 being a rigidly strengthening and supporting means for outer part 94 and inner part 95, which are both integral parts of needle valve control body 68.

Stepped piston 56 is compressively held in a centered position by compressive springs 78 and 76 which are retained in position by retaining pins 79, 80 and 77, 75, respectively, and is adjustably compressively tightened or loosened by external adjustment means 70, which has a packing means 71 mounted thereon, for a purpose which will be later explained. The adjustment of control means 70 is accomplished by threaded portion 74 which engages threaded portion 72 within housing 54. Stepped piston 56 may also be operated by being connected to a connecting rod and crank shaft as is shown in FIGURE 5 and driven by some external source of energy or energy be taken therefrom for external use, which could be an assisting means in the compression of vapors at point 50.

Stepped piston 56 is preferably constructed with the cross areas of small piston 87 and large piston 88 being that of a preselected balanced temperature and pressure condition of a fluid with its liquid state being against the head of piston 87 from conduit 36 and the vapor state being against the head of piston 88 as from conduit 20, as for instance in the use of Freon 12 where the temperature of the compressed liquid in conduit 36 is 86° F. and the temperature of the expanded vapor in the evaporative conduit 20 is 5° F., so that the substantially equal opposing energies are balanced through the stepped piston 56 in its use in the system.

In the operation of the fluid expansion means 30 of FIGURE 7, when the compressive portion of an energy wave in conduit 36 from an energy wave generator pushes against the end of piston 87 then large piston 88 likewise forms a compressive portion of an energy wave which goes outward in the vapor in conduit 20 as indicated by the direction of the arrows. But when the compressive springs 78 and the compressed vapor, as well as the rarefaction portion of the energy wave in conduits 36 and 20, return the stepped piston 56 against the compressive springs 76, then a dual increase of energy is given to the energy wave by this return action. The first of these is that there is a release of fluid pressure from conduit 36 through bore 60 within small piston 87 past needle valve 62. It is well known that to increase the intensity of an energy carrying wave, pressure or energy may be withdrawn during the rarefaction phase of the energy wave. So it may be seen that there is a resultant increase of energy given to the energy wave entering conduit 36. A still greater factor in the increasing of the energy bearing wave going outward from conduit 20 is that when the compressed liquid is released on the return stroke of piston 88 by needle valve 62 within the evaporative area of conduit 20, then a substantially instantaneous cooling effect is given during the rarefaction phase of the energy wave going outward from large piston 88 into the evaporative area represented by conduit 20. It is well known that to add cold to or subtract heat from or during the rarefaction phase of an energy wave increases the intensity of the whole of the wave, so here energy is given to or increased in the energy wave. Thus it may be seen that fluid expansion means 30 does in fact have a dual effect in increasing the intensity of the energy carrying wave.

Also, if desired, for fluid expansion means 30, an implosion or implosive reaction energy wave generating fluid expansion means as shown in FIGURE 3 of my co-pending application Ser. No. 149,953 may be used. Except as used in this application, the positioning of the means is reversed as used in the co-pending application, with the implosive reaction generator being faced towards the vapor portion of the system, and not towards the liquid phase of the system. Used in this manner, it may be an assisting force, when used with any of the energy wave generators heretobefore described, in the accelerating of energy waves to velocities beyond sonic velocities, or it may be used singly or in series with itself as the sole means of energy wave generation in the system wherein pressured fluid is applied to it. Connecting means, such as the connecting rod and crankthrow of FIGURE 5, may be used with some external power source or as an external power source for use, which could be in the assisting of compression of the expanded fluid to a higher pressure, as in its return in the condensing portions of the system.

The fluid expansion means of FIGURE 7 or the means of FIGURE 3 of my co-pending application Ser. No. 149,953 when used in combination with any of the energy wave generators discussed in this application, may be used to transfer heat or cold to or from a distance, as to or from some target, which could be heat within the earth or heat removal from various processes after their work has been accomplished by the heat, or cold to cold receiving stations as of different floors of a building or separate buildings to which cold is desired to be delivered and received, from an area of absence of heat whereby the heat is abstracted from or cold given into the rarefaction portion of the energy waves that transfer the cold. They may also be used to vaporize or assist in the vaporization of liquids to form steam or vapor for use in the various vapor distillation processes such as used in refineries and saline water conversion processes and the energy given off during and by the fluid expansions and added to the energy waves being created by the energy wave generators could be utilized for useful work, as in other portions of the systems and processes.

Next considering FIGURE 8 which is of another fluid compression means 50 wherein there is an outer cylindrical body 100 which is rigidly and securely attached to valve body 105 and then to entering vapor conduit 22 at the left side, and to the right. Within cylindrical body 100 there is two stepped diameter piston 130 and 150 which is preferably composed of two parts, the larger of the parts of piston 130 being in sliding contact with the large internal bore 121 within cylinder 100 and has sealing member 132 thereon and is attached as by threaded portion 159 to threaded portion 158 of a smaller part of piston 150 which has sliding engagement within bore 146 in body 100 and is in sealing engagement with bore 146 by means of sealing member 147.

Within larger piston part 130 there is located ring valve 141 which seats on valve seats 140 that allow unidirectional opening of the ring valve towards ports 143 which are located rearwardly on smaller piston part 150. Spring holding members 134 are several in number and are axially spaced on a radius from the center of piston 130 and screw threadedly engaged into ring valve 141 and locked by nut means 142 after proper compression of valve springs 136 has been accomplished. Valve springs 136 are retained in proper position by retainers 135 and recess bores 137 which are in axial position on ribs 139 which rigidly connect larger piston 130 with screw thread attachment means 159. There are open bores 138 in alternation with ribs 139, which allow unidirectional flow of fluids to the right in the direction of the arrows when ring valve 141 is open. Within smaller piston 150 there is located valve 149 which is unidirectionally urged to a seating with valve seat 148 by means of compression spring 154 which is held in position by valve guide 153 and retainer 155 and held in desired compression by locking nut means 156, said valve 149 allowing flow of fluid from ports 143 unidirectionally to the right from the head of the smaller piston 150. Valve guide 153 is rigidly held in position by ribs 151 which are preferably three in number in order to allow a maximum amount of area in bores 152 for flow of fluid therethrough.

Stepped-diameter pistons 130 and 150 are compressively held in a centering position by compressive springs 116 and 119 which are retained in position by retaining pins 115, 117 and 118 and 121, respectively. Retaining pins 115 are recessed within valve body 105, retaining pins 117 and 118 are recessed within opposite sides of large piston 130 and retaining pins 121 are part of spring adjustment member 122. Spring adjustment member 122 has, on its shaft, sealing member 123, and has screw threads on a portion thereof that engage screw threads within body 100, so that increasee or lessening of a compressive force may be exerted upon compressive springs 117 and 119, by turning of adjustment member 122.

Valve body 105 is rigidly held in position between cylindrical body 100 and fluid entering conduit 22 by bolt means 103 which engage pressure ring 104, and is kept by sealing engagement with said members by sealing members 162 and 164. Valve 106 is urged to a seating engagement with valve seat 113 by compressive spring means 112, which is held in position by valve guide 107 and retainer 108 which is locked in proper compressive condition by nut means 109. Valve guide 107 is held in proper alignment by means of ribs 111 which are preferably three in number so as to allow a large amount of fluid to flow unidirectionally through ports 110 towards large piston 130 when valve 106 is opened. Stepped piston 130 and 150 may also be operated by being connected to a connecting rod and crankshaft as is shown in FIGURE 5 and driven by some external source of energy, which could be from the energy derived by the expansion of the fluid as by fluid expansion means 30.

Stepped pistons 130 and 150 are preferably constructed with the areas of small piston part 150 and large piston part 130 being that of a preselected balanced temperature and pressure condition of a fluid with its substantially all liquid phase being against the head of piston 150 from conduit 24 and the vapor state being against the head of large piston 130 as from conduit 22, as, for instance, in the use of Freon 12 where the temperature of the compressed liquid in conduit 24 is 95° F. and the temperature of the expanded vapor in evaporative conduit 22 is 0° F., so that substantially equal opposing energies are balanced throughout the stepped pistons 130 and 150 in its use in the system.

In the use of this means of fluid compression 50 of FIGURE 8 in a system also using the fluid expansion means 30 of FIGURE 7 where conduits 22 and 24 are connected to opposite sides of an evaporative area 16, the piston areas of large piston 130 of FIGURE 8 and piston areas of large piston 88 of FIGURE 7 should be in approximate balance so that a balanced condition of pressure would exist across the evaporative area.

In the operation of the fluid compressive means 50 of FIGURE 8, when the compressive portion of an energy wave in conduit 24 reverses back from an energy wave generator against the end of piston 150, large piston 130 has a compressive action against the area encompassed between valve head 106 and said piston 130. That compressive action against any fluid therein forces the fluid outward past ring valve 141 into the expanding area in cylinder 100 and closes valve 106 against any entry of fluid from conduit 22. However, when the rare-faction portion of the energy wave in conduit 24 contacts the head of small piston 150, the compressed springs 116 and where the evaporative area or tubes 18 contained in evaporator 16 are properly tuned as to length so that an integer multiple of a half wave length of the fundamental wave length or one of its harmonics matches an integer multiple of a half wave length of the prime wave length or one of its harmonics being generated in the condenser by the energy wave generator, the compressive portion of the wave in the evaporator opens valve 106 and acts as an assisting compressive force against large piston 130 to compress the fluid between valve 141 riding with piston 130 and through the ports in the rear of small piston 150 and out through the valve 149 in the head of piston 150.

Where the pressure area of the large piston 130 equals the density of the refrigerant in its vapor state from conduit 22 as compared to the pressure area of the smaller piston 150 against the refrigerant in its liquid state in conduit 24, the movement of the piston forward imparts a liquefying pressure on the fluid going outward past valve 149 and but for the heat contained in the fluid it would be in a completely liquid state. Upon the next reversal of the compressive impulse this heat is substantially absorbed into this compressive portion of the integer multiple of the half wave being generated in the condenser and the energy wave is greatly encouraged or intensified for its next reversal of compression which in turn causes greater compressive action within cylinder 100 and greater cooling in the evaporator section 16 as well as more heating effect, by that heat not absorbed by the compressive portion of the energy wave, in the condensing portions 12 and 14. Where more heat was desired to be obtained from the condensing portion of the system, as might be desired in heat pumping for home and industrial use, then heating tubes could be conducted off of the area between valve 106 and piston 130 and/or the area between valve 141 riding in piston 130 and the intake ports 143 in small piston 150, and the heat taken from these tubes or condensing areas.

Also, any of the above energy wave systems using the fluid compressing means of FIGURE 8 may be employed to transfer heat to a distance, as to some target, which could be an oil bearing formation, or a heat receiving station as to different floors of a building or separate buildings to which heat is desired to be delivered and received, from a source of heat whereby the heat is given into the compression portion of the energy wave that transfer the heat. They may also be used to liquefy gases and as condensing means for used steam and the various vapor distillation processes such as used in refineries and saline water conversion processes and the heat of vaporization could be given over into energy wave energy which could be utilized ahead of the energy wave generators for useful work, as in other portions of the systems and processes.

Operation of the combined uses of the more complex means in refrigeration, air conditioning and heat pumping Discussing the combined uses of FIGURE 5 for the pumping means 10, FIGURE 7 for the fluid expansion means 30, and FIGURE 8 for the fluid compression means 50, as in the schematic heating and cooling system represented in FIGURE 1, it is preferable to connect the conduit 20 leading from fluid expansion means 30 to the bottom coils 18 of the evaporator 16, and the conduit 22 leading to the fluid compression means 50 to the top of the coils 18 of the evaporator 16, this to insure at any time that all liquid will be available to the fluid expansion means 30.

The fluid pumping means 10 may be connected adjacent either fluid expansion means 30 as by conduit 36 or by conduit 24 to fluid compression means 50, and thus have the condensing coils 26 and 28 of condensers 14 and 12, respectively, in a single unit wherein an integer multiple of a half wave of the prime wave length or one of its harmonics could be used throughout all of the condenser. However, it is preferred in most uses where an energy wave generator as in FIGURE 8 is used to divide the condenser into at least two portions as shown in FIGURE 1 and so tune them as to length so that an integer multiple of a half wave of the fundamental wave length or one of its harmonics is used in each of the portions of the condenser. Although any frequency may be used, including those in the audible range or those in the ultrasonic range, in the whole of this more complex form of the invention, yet it is found to be desired to have such a system down in the inaudible or infrasonic range, which would preferably include those frequencies from twenty cycles per second on down. The evaporative unit 16 is preferably tuned in length to an integer multiple of a half wave of the prime wave length or one of its harmonics that is being used in the condenser or condensers and in this way the whole of the system is kept in energy wave balance in a circulatory manner.

In loading the system with refrigerant, care should be taken that equilibrium is maintained between the liquid phase of the refrigerant and the vapor phase of the refrigerant, in that all liquid is pumped into the condenser or condensers with the liquid being against the head of the small piston 150 of FIGURE 8 and liquid being completely around the tapered end 61 of the needle valve 62 of FIGURE 7, and in actual practice it would be desirable to have liquid up into bore 81 surrounding needle valve 62. When the system is not operating then, as is the case in most conventional refrigerating systems, pressures are substantially equalized in the evaporator portion and in the condensing portions of the system. This is due to the fact that although needle valve 62 has a close tolerance of fit with bore 60 that is within small piston 87, yet leakage of pressure in time will occur around needle valve 62. However, the system may be started up immediately after shut down and is not like most conventional systems wherein a high head pressure exists in the condenser and requires a wait for the pressure to bleed down before again starting the system. The reason that this system being explained may be started at any time is that the fluid pumping means 10 is an energy wave generator and it is the energy wave impulses that do the work in the system and these impulses begin small in intensity and increase to a certain maximum value at a later time of operation after there has been a build up of intensity by the repetitive operation of the energy wave generator and the increase of energy in the energy waves by the repetitive addition of heat to the compression portion of the wave and the repetitive subtraction of energy from and the repetitive addition of cold to the rarefaction portion of the energy waves being circulated in the system. In this manner but a small input of outside energy is needed in the system to initiate and maintain the energy waves being circulated in the system.

Where the energy wave generator of FIGURE 6 is substituted for that of FIGURE 5 in this more complex form of the invention, the energy wave generator of FIGURE 6 is desirably placed in substantially the center of the condensing units 12 and 14 and it is preferable to use a half wave length or an integer multiple thereof of the prime wave or one of its harmonics in the condensing units 12 and 14 so that the energy wave generator of FIGURE 6 is at a quarter wave length, or an integer multiple thereof of the prime wave or one of its harmonics, away from both fluid expansion means 30 and fluid compression means 50, this due, as earlier explained in this application, to this form of wave generator being preferably operative upon the particle velocity no pressure variation portion of an energy carrying wave.

In this more complex form of the invention, an implosion and implosive reaction type of energy wave generator, such as that shown in FIGURE 2 of my co-pending applications Ser. No. 149,953, may be substituted for that in FIGURE 5, and the system still will be maintained in substantial equilibrium, both as to energy waves being circulated and pressure balance throughout the various portions of the system. Also, the implosion and implosive reaction wave generating type of fluid expansion means such as that shown in FIGURE 3 of my co-pending application Ser. No. 149,953 may be substituted for the fluid expansion means of FIGURE 7, except, as earlier shown in this application, the position of the implosion wave generator should be reversed in its position with the implosion causing end facing the evaporator means 16 so that a circulatory system of energy bearing waves may be maintained in the system. This type of fluid expansion means may be used with the other types of energy wave generators or it may be used in conjunction with an implosive type of energy wave generator.

So it may be seen that with the initiating of an energy wave of small intensity in the liquid portion of the system, then in a circulatory manner this energy wave going outward first has its compression portion impressed upon the end of small piston 87 of FIGURE 7, this is turn compresses springs 78 and at the same time forms a compressive portion of an energy wave outward into evaporative means 16 and it travels therein until it strikes the inside of valve 106 of FIGURE 8 which it opens and the compressive portion of the wave is impressed upon the rear of large piston 130 which causes a movement of the piston 130 which compresses springs 119 and vapor within cylinder 100 ahead of piston 130 and this compressed vapor is educted out through bores 143 past the valve 149 which is in the head of small piston 150 and this partially liquefied vapor is thus injected into the rarefaction portion of the energy wave that is being created by the forward thrust of the energy wave generator.

Now consider what occurs during the rarefaction reverses of the energy wave in the system, beginning as above when the compressed vapor is educted into the condenser by the action of the fluid compression means of FIGURE 8. The energy wave generator reverses itself upon the lower pressured fluid that is in condenser portion 14 and in so doing it exerts the compressive portion of an energy wave upon the compressed fluids that have just been educted from the end of small piston 150 of the fluid compressive means and this educted fluid is added into this compressive portion of the energy wave and its heat is given over to increasing the energy content of the whole of the energy wave as it travels towards the intake side of the energy wave generator, whereupon the next reversal of the energy wave generator this fluid and the increased energy in the wave is compressed through the wave generator and goes out through valve 8 of FIGURE 5 where it enters into the rarefaction area being created by the reversal of the piston wave generator 3, whereupon the next reversal of the piston wave generator 3 in forming the compressive portion of the energy wave going towards the fluid expansion means of FIGURE 7 causes the fluid and the augmented energy to go into the outgoing compressive portion of the energy wave.

When this compressive portion of the energy wave contacts the head of small piston 87 of FIGURE 7 it causes the large piston 88 to go outward where it compresses the springs 78 and also forms the compressive portion of an energy wave going outward in evaporator 16. Upon the reversal of large piston 88 caused by the action of the compressed springs 78 as well as the rarefaction portions of the energy waves in both the evaporator 16 and the condenser portion 12, then the tapered end 61 of needle valve 62 opening out of bore 60 allows liquid to expand into the evaporator area 16. As explained earlier, this eduction of the liquid during the rarefaction portion of the energy wave being in condenser portion 12 causes an increase in the energy of the whole of the wave. This eduction of the liquid into evaporator section 16 during the rarefaction portion of the energy wave being maintained therein also causes an increase in the energy content of the whole of the energy wave due to the cooling effect of the expanding liquid. Upon the next reversal of the energy wave in evaporator portion 16 of the system, this added fluid is compressed into the reversing compressive portion of the energy wave therein and this compressing of the fluid particles into the energy wave also has some additive energy effect upon the whole of the wave. This compression portion of the wave crosses the evaporator 16 where it strikes valve 106 and opens the valve and in so doing it deposits added fluid particles into and compressive energy into the rearward portion of cylinder member 100 and the cycle begins over again.

In my issued Patent Number 3,006,154 and my co-pending application Ser. No. 149,953, I teach and claim the creation and maintenance of an energy standing wave in heating and cooling systems and the increasing of its energy content by the addition and subtraction of energy therefrom at the proper phase angle of the wave, but I included only one stage of compression of the heat of the vapor into the energy wave to increase the energy content thereof. The additional three stage fluid compressing means 50 as in FIGURE 8 of this application may be added to these other disclosed methods of heating and cooling and additional increases of energy may be added to the energy standing waves of these systems thereby and considerable additional increases of heating and cooling effects may be added thereto.

By the repetitive accelerations of the energy waves, as earlier described and taught in this application, traveling energy waves having unidirectional paths may be created and maintained throughout the heating and cooling systems shown in this application, and, if desired, accelerations of the energy waves may be increased to where the unidirectional velocities of the energy waves may greatly exceed the velocity of sound in the fluids. Heating and cooling systems employing these highly accelerated energy waves would be particularly efficient with certain types of refrigerants, such as the Freons, where large volumes of refrigerants must be circulated in order to obtain the same refrigerating and heat transfer effects, as compared with other refrigerants, such as ammonia and sulfur dioxide.

Modifications

The various heating and cooling systems disclosed in this application, and their various variations as are capable of being conceived by those skilled in the art, are useful for many other forms of domestic and industrial application besides those discussed as to the use of the entire systems or parts thereof, as discussed particularly as to refrigeration, air conditioning and heat pumping.

They may be used in the processing, storage and transportation of liquefied petroleum gases and other volatile fluids.

They may be used in the cryogenic operations, whether it be processing, storage, or transportation of cryogenic fluids, such as methane, oxygen, nitrogen, hydrogen, helium, etc. Especially will the more complex systems shown in this application be useful for liquefication of these cryogenic fluids, wherein they may be used in the compressing, transfer and heat exchange of these high vapor pressure fluids in such liquefying processes as those applied to extracting helium from natural gases, those used in discharging nitrogen from natural gases, those that use the Claude cycle of flash evaporation and of expansion engines, and those that use the cascading principle wherein refrigerants of progressively higher vapor pressures are used in series in producing refrigeration down to very close to absolute zero temperature.

It is in the concept of the various systems shown in this application to be used in the various saline water conversion processes. For instance, in the direct freezing processes wherein the evaporator as herein claimed may be a container of saline water from which the heat of fusion may be removed by the refrigerant being in direct contact with the saline water, and the refrigerant may be the water vapor or immiscible or volatile compounds such as the Freons, butanes, propanes, etc., which are removed from direct contact with the water by causing a low pressure to be maintained on the container and thus cause vaporization of the refrigerant. The use of energy bearing waves are particularly conductive to saline water conversion in that the removal of the refrigerant from the saline water and the formation of ice thereby would be greatly enhanced by the energy bearing waves therein, this factor of increase of efficiency being additive to the low energy requirements of condensing the removed vapors within the condenser. It is also within the concepts of this invention, where water vapor removed from the container is the direct refrigerating means, that the water vapor condensed in the condenser may be drawn off as product or fresh water while also using the ice so formed in the container upon being melted as another source of fresh or product water. In this manner the heat rejected or transferred in the condensing of the refrigerant by the energy carrying waves may be the melting means when so placed in heat exchange with the ice. This invention may also be used in the various hydrate processes and vapor compressive systems that are used in saline water conversion to fresh water.

In the refrigerating systems so far described wherein an energy bearing wave is used, as has been explained, the liquid and the vapor of the systems are substantially in equilibrium, although if desired there may be a liquid sump or basin in the evaporator portion. I have found that the efficiency of heat exchange of the systems of this character may be increased by creating and maintaining an energy carrying wave, which may be of the standing wave form or of the traveling wave type, in the condensing portions, or in the evaporator portion, or both.

Although the specific action of energy bearing waves in the portions of refrigerating systems are not to the fullest extent understood, it is found that at least a two-fold result is produced thereby. First, it is the turbulizing or agitation in the flow of the refrigerant in either the condensers or the evaporator or both which serves to increase the facility and effectiveness of the heat transfer co-efficiency of the vapor and liquid phase contacts with the containing walls of the system by the reduction in the thickness of the boundary layers on these walls through which the heat must be transferred. Secondly, the conversion of vapor into liquid by the compressive forces of the several steps of compression caused in the system by the energy waves allows conversion of heat of vaporization into a substantial amount of energy with sonic characteristics so that the energy is utilized and/or attenuated at a point distant from its entry into the condenser, and the energy waves in the evaporator assist in the breaking of surface tension of any liquid allowed in the evaporator as well as causing uniform distribution of heat inducing low pressure vapor throughout the evaporator.

It is further understood that the systems disclosed in this invention and its concepts extend to absorption and adsorption refrigeration processes.

The foregoing is considered as illustrative only of the principles of this invention. Further, since numerous modifications and changes will readily occur to those skilled in the art, it is not desired to limit the invention to the exact constructions and operations shown and described, and accordingly all suitable modifications and equivalents may be resorted to, falling within the scope of the appended claims.

I claim:
1. A method of heating or cooling which comprises:
placing a liquid in equilibrium with its vapor in a closed system having an evaporator, and a condenser which is divided into increasingly pressured portions of substantially all liquid; and
substantially maintaining said equilibrium by a back pressure maintained between the liquid and the vapor;
while circulating said liquid unidirectionally from the lower pressured portion of said condenser to the higher pressured portion by liquid circulating means positioned between said portions in said condenser, wherein said liquid circulating means comprises a liquid pump compressing the liquid by an amount necessary to maintain a liquid pressure differential between said lower and higher pressured portions substantially upstream and downstream of the pump within the condenser.

2. A method of heating or cooling which comprises:
placing a liquid in equilibrium with its vapor in a closed system having an evaporator and a condenser which is divided into portions; and
substantially maintaining said equilibrium between the liquid and the vapor;
while circulating said liquid unidirectionally from one portion of said condenser to the other portion by liquid circulating means positioned between said portions in said condenser, wherein said liquid circulating means comprises an energy wave generator.

3. The method of claim 1 wherein a fluid expansion means and a fluid compressing means are placed in the system respectively between the evaporator and opposite ends of the condenser and the unidirectional circulation of said liquid is toward said fluid expansion means.

4. The method of claim 1 wherein a fluid expansion means and fluid compressing means are placed in the system respectively between the evaporator and opposite ends of the condenser wherein said fluid compressing means is a fluid area decreasing restricting means for transfer of the heat of the vapor into the liquid of the lower pressured portion of said condenser for discharge therefrom.

5. A method of claim 1 wherein a fluid expansion means and fluid compressing means are placed in the system respectively between the evaporator and opposite ends of the condenser, said fluid compressing means being driven by the energy from the pressure drop in the fluid expansion means and the unidirectional circulation of said increasingly pressured liquid in said portions of the condenser is toward said fluid expansion means.

6. The method of claim 2 wherein a fluid expansion means and a fluid compressing means are placed in the system respectively between the evaporator and opposite ends of the condenser.

7. A method of heating or cooling which comprises:
   placing a liquid in equilibrium with its vapor in a closed system having an evaporator and a condenser which is divided into portions; and
   substantially maintaining said equilibrium between the liquid and the vapor;
   while circulating said liquid unidirectionally from one portion of said condenser to the other portion by liquid circulating means positioned between said portions in said condenser, wherein said liquid circulating means comprises a liquid pump;
   a fluid expansion means and fluid compressing means being placed in the system respectively between the evaporator and opposite ends of the condenser, said fluid expansion means being an implosion and implosive reaction generator so that energy waves are produced in the system thereby.

8. A method of heating or cooling which comprises:
   placing a liquid in equilibrium with its vapor in a closed system having an evaporator and a condenser which is divided into portions; and
   substantially maintaining said equilibrium between the liquid and the vapor;
   while circulating said liquid unidirectionally from one portion of said condenser to the other portion by liquid circulating means positioned between said portions in said condenser, wherein said liquid circulating means comprises a liquid pump;
   said liquid pump comprising energy wave generators so that traveling energy waves are produced in the system thereby.

9. The method of claim 2 wherein a fluid expansion means and fluid compressing means are placed in the system respectively between the evaporator and opposite ends of the condenser, said fluid compressing means being a fluid restricting means.

10. The method of claim 6 wherein the fluid expansion means is an energy wave focusing means for transmitting energy waves into the evaporator.

11. The method of claim 6 wherein said fluid expansion means is oscillated by said energy waves and releases liquid on the rarefaction portion of its oscillation.

12. The method of claim 6 wherein said fluid compressing means is oscillated by said energy waves and compresses fluid into said condenser during the rarefaction portion of an energy wave therein.

13. The method of claim 11 wherein said fluid expansion means is an implosion and implosive reaction generator which augments the energy waves in the system.

14. The method of claim 12 wherein said compressed fluid from the evaporator into the condenser is compressed into the energy wave during a compression portion of the energy waves therein, thereby adding energy to the energy waves.

15. The method of claim 12 wherein said compressing means is in compression stages which progressively increase the compression pressure.

16. The method of claim 11 wherein said release of liquid increase the energy of the energy waves in both the evaporator and the condenser.

17. A method of refrigeration in a system having an evaporator, several portions of a condenser, and a pump operatively connected therewith for circulating the refrigerant in said system comprising:
   transferring refrigerant in its vapor phase by the action of said pump from the evaporator to the several portions of the condenser in order to convert it from its vapor to its liquid phase,
   said liquid phase forming a progressively pressured column substantially filling the several portions of said condenser,
   simultaneously inducing a periodic compressive impulse in said column whereby to compress said refrigerant and to produce and maintain a standing sonic wave in the several portions of the liquid column and thereby to increase the pressure peaks within the liquid in said portions of said column,
   said compressive impulse being of a velocity sufficient to effect a periodically induced rarefied area in the lowest pressured portion of said liquid column of a pressure sufficiently low to induce the introduction of vapor from said evaporator to be absorbed by said liquid after reversal of said periodic compressive impulse immediately upon the instance of the next periodic compressive impulse,
   simultaneously withdrawing heat from the several portions of the condenser,
   moving the refrigerant in its liquid phase from the highest pressured portion of the condenser to the evaporator, and
   permitting the refrigerant to expand from its liquid to its vapor phase in the evaporator.

18. The method of claim 17 wherein the step of moving the liquid from the highest pressured portion of the condenser into the evaporator is periodically effected during the rarefaction phase of the sonic standing wave,
   whereby to increase pressure peaks within the liquid refrigerant in the several portions in said column.

19. The method of claim 17 wherein the circulation of the refrigerant is unidirectional.

20. The method of claim 17 wherein the pump is employed to create the compressive impulse.

21. The method of claim 18 wherein the sonic standing wave is created by the periodic eduction of liquid from the highest pressured portion of the condenser into the evaporator.

22. The method of claim 18 wherein the pump is employed to create the compressive impulse.

23. A method of refrigeration in a system having an evaporator, several portions of a condenser, a pump operatively connected therewith for circulating the refrigerant in said system and an expansion valve operatively interposed between said pump and said evaporator, comprising:
   transferring refrigerant by said pump from said evaporator to the lowest pressured portion of several portions comprising the condenser in order to convert it from its vapor phase to its liquid phase, and
   simultaneously through said valve transferring refrigerant from the highest pressured portion of the several portions of said condenser to said evaporator,
   said liquid phase forming a column substantially filling the several portions of said condenser,
   inducing an intermittent rarefying and compressive impulse into said column whereby said valve creates and maintains a sonic standing wave in said several portions of the condenser,
   said intermittent impulse being of a velocity sufficient to effect a periodically induced rarefied area in the lowest pressured portion of said liquid column of a pressure sufficiently low to induce the introduction of vapor from said evaporator to be absorbed by said liquid in the lowest pressured portion after reversal of said intermittent impulse from its compressive to its rarefying phase immediately upon the instance of the next compressive phase, simultaneously withdrawing heat from the portions constituting the condenser, and moving said refrigerant in its liquid phase from the highest pressured portion of the several portions of the condenser to the evaporator and permitting the refrigerant to expand from its liquid to its vapor phase in the evaporator.

24. The method of claim 23 wherein the expansion valve is vibrated by the pump to produce said sonic wave.

25. The method of claim 23 wherein a sonic standing wave is introduced into said evaporator by said valve simultaneously with the introduction of said sonic standing wave into the several portions constituting the condenser.

26. The method of claim 23 wherein said pump induces said intermittent rarefying and compressive impulse.

27. The method of claim 25 including the step of operating said pump simultaneously to circulate said refrigerant and produce a sonic standing wave in the several portions of said condenser and by the operation of said pump, vibrating said expansion valve to produce said sonic standing wave in said evaporator.

28. The method of claim 26 wherein the step of moving the liquid from the highest pressured portion of the several portions of the condenser into the evaporator is periodically affected during the rarefaction phase of the sonic standing wave, whereby to increase pressure peaks within the liquid refrigerant in the several portions constituting said column.

29. The method of claim 17 wherein said pump is located in said condenser between said lowest pressured and said highest pressured portions of said condenser.

30. The method of claim 23 wherein said pump is located in said condenser between said lowest pressured and said highest pressured portions of said condenser.

31. The method of claim 29 wherein the pressure across said pump is balanced by having a larger area across the intake of said pump from the lowest pressured portion as compared to the outlet into the highest pressure portion, whereby pressures across the pump are substantially in balance.

32. The method of claim 30 wherein the pressure across said pump is balanced by having a larger area across the intake of said pump from the lowest pressured portion as compared to the outlet into the highest pressure portion, whereby pressures across the pump are substantially in balance.

33. The method of claim 31 wherein the pump is employed to create the compressive impulse.

34. The method of claim 32 wherein said pump induces said intermittent rarefying and compressive impulse.

35. The method of claim 33 wherein the compressive impulse is the means of operating several stages of compression of the vapor from the evaporator into the lowest pressured portion of the several portions constituting the condenser.

36. The method of claim 35 wherein there is substantially pressured balance across said several stages of compression beginning with the vapor and ending with its introduction into the lowest pressured portion of said condenser.

37. The method of claim 34 wherein there is substantially pressured balance across said expansion valve from said highest pressured portion and across said several stages of compression into said lowest pressured portion of the condenser.

38. The method of claim 37 wherein there is substantially pressured balance throughout said evaporator and said condenser, whereby there is substantial balance in the rarefying and compressive impulses throughout all of the system.

39. A method of claims 2 wherein a fluid expansion means and fluid compressing means are placed in the system respectively between the evaporator and opposite ends of the condenser, said fluid compressing means being a compression engine which is driven by the energy from the pressure drop in the fluid expansion means.

40. The method of claim 3 wherein said fluid expansion and back pressure means is a capillary tube, expansion valve, or motor used as a power source.

41. The method of claim 4 wherein said fluid compressing means contains unidirectional fluid flow entrapment means to prevent reversal of fluid flow from said condenser into said evaporator.

42. In a heat exchange system wherein fluid undergoes a change in state to absorb heat in a vapor phase and release heat in a liquid phase as the fluid is circulated between heat absorbing and heat removal zones, a method of increasing the rate of heat transfer to and from said fluid increasing the steps of: producing an abrupt change in pressure of the fluid in a completely liquid phase by compression thereof at a predetermined location in the heat removal zone by an amount necessary to maintain a relatively low liquid pressure upstream of said location and a relatively high liquid pressure downstream of said location while inducing flow of fluid in one direction; volumetrically compressing the fluid upstream of said location to change the fluid to the liquid phase under said relatively low liquid pressure; volumetrically expanding the fluid downstream of said location to change the fluid into the vapor phase under said relatively higher liquid pressure; and removing heat from the liquid phase of the fluid both upstream and downstream of said location within the heat removal zone.

43. The method of claim 42 further including the step of: converting energy of the fluid while being volumetrically expanded into mechanical energy for external use.

44. The method of claim 43 further including the step of: imparting wave energy to the fluid while in the liquid phase within the heat removal zone.

45. The method of claim 42 further including the step of: imparting wave energy to the fluid while in the liquid phase within the heat removal zone.

46. In a system for heating and cooling that contains liquid in substantial equilibrium with its vapor in a closed system having an evaporator and a condenser and means for vaporizing the liquid into the evaporator and means for compressing the vapor into liquid in the condenser, a method of increasing the heat transfer efficiency of heat from the condenser into a surrounding medium which comprises:

increasing the pressure of the liquid upon said means for vaporizing the liquid into the evaporator by means of a liquid pump placed in the liquid of the condenser between said means for compressing the vapor and said means for vaporizing the liquid into the evaporator;

increasing the temperature of said liquid in the condenser between said liquid pump and said means for vaporizing the liquid into the evaporator to a value above that resulting from conversion of mechanical pump energy into heat added to the liquid and in excess of the heat of compression of the vapor into the liquid of the condenser by the increase of pressure applied by said liquid pump compressing the liquid by an amount necessary to maintain a liquid pressure differential between the liquid substantially upstream and downstream of said pump;

thereby increasing the heat transfer efficiency between said condenser and said surrounding medium by the differential of heat increase within the pressured liquid in said condenser above that of the surrounding medium.

47. The method of claim 46 wherein said condenser is placed within a medium to be heated.

48. The method of claim 46 wherein said evaporator is placed within a medium from which heat is to be withdrawn.

49. The method of claim 46 wherein said means for vaporizing the liquid into the evaporator supplies external energy which is utilized to assist in driving said liquid pump or said means for compressing the vapor into the liquid within said condenser.

References Cited
UNITED STATES PATENTS

| | | | |
|---|---|---|---|
| 3,262,281 | 1/1966 | Alexander | 62—115 |
| 1,467,489 | 9/1923 | Norberg | 230—183 X |
| 2,494,120 | 1/1950 | Ferro | 62—87 |
| 2,916,200 | 12/1959 | Siegmund | 62—115 X |
| 2,938,361 | 5/1960 | McNutt | 62—510 X |
| 2,953,095 | 9/1960 | Bodine | 103—1 |
| 2,960,314 | 11/1960 | Bodine | 165—1 |
| 2,986,898 | 6/1961 | Wood | 62—174 |
| 3,006,154 | 10/1961 | Brandon | 62—115 |
| 3,079,764 | 3/1963 | Wescott | 62—118 |
| 3,255,699 | 6/1966 | Bodine | 103—1 |
| 2,497,450 | 2/1950 | Gygdx | 62—510 X |

ROBERT A. O'LEARY, Primary Examiner

C. SUKALO, Assistant Examiner

U.S. Cl. X.R.

62—498, 510

UNITED STATES PATENT OFFICE
CERTIFICATE OF CORRECTION

Patent No. 3,473,344    Dated October 21, 1969

Inventor(s) Clarence W. Brandon

It is certified that error appears in the above-identified patent and that said Letters Patent are hereby corrected as shown below:

Column 1, in heading designating the assignees, add:

--five percent to Harvey B. Jacobson, Washington, D. C., and fifty percent to N. A. Hardin, Catherine H. Newton, and Hazel H. Wright, all of Forsyth, Georgia--.

SIGNED AND SEALED
OCT 27 1970

(SEAL)
Attest:

Edward M. Fletcher, Jr.
Attesting Officer

WILLIAM E. SCHUYLER, JR.
Commissioner of Patents